Feb. 2, 1937. G. R. DEMPSTER 2,069,697
TRANSPORTING AND DUMPING VEHICLE
Filed Feb. 5, 1935 2 Sheets-Sheet 1
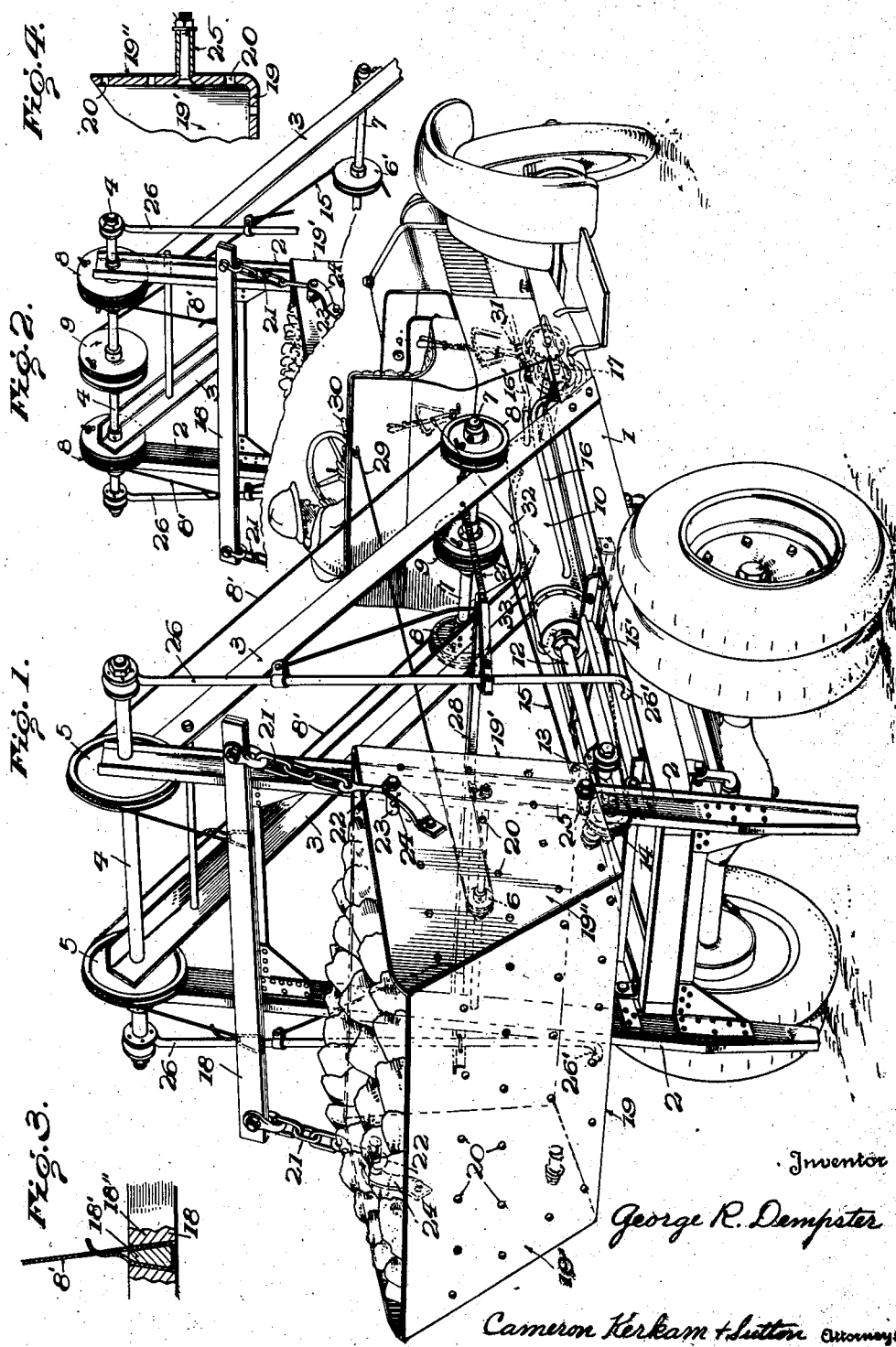

Feb. 2, 1937.　　G. R. DEMPSTER　　2,069,697
TRANSPORTING AND DUMPING VEHICLE
Filed Feb. 5, 1935　　2 Sheets-Sheet 2
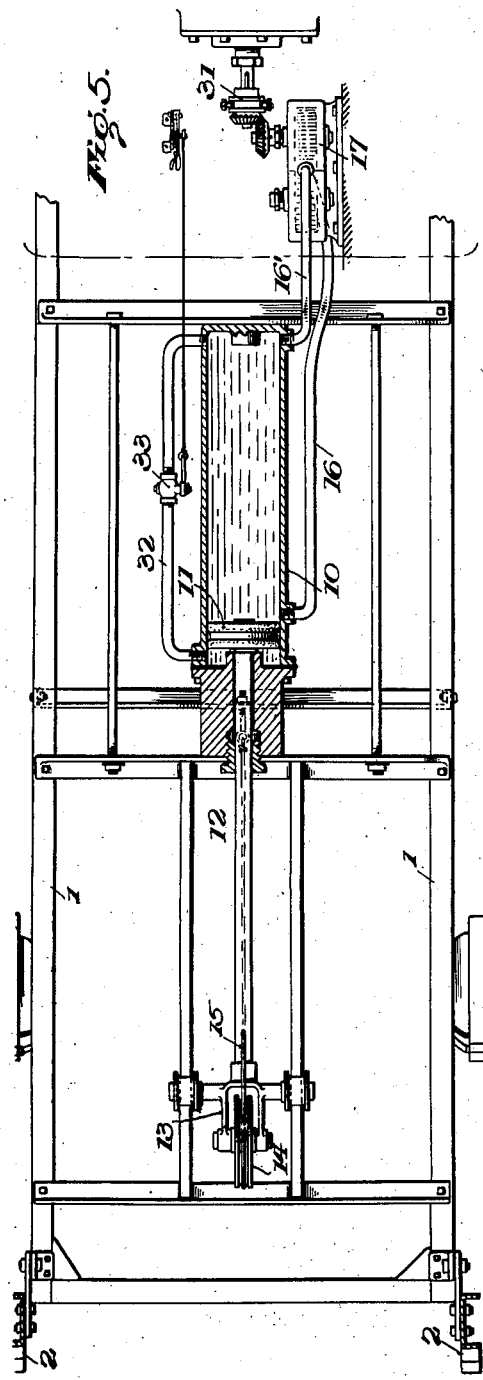
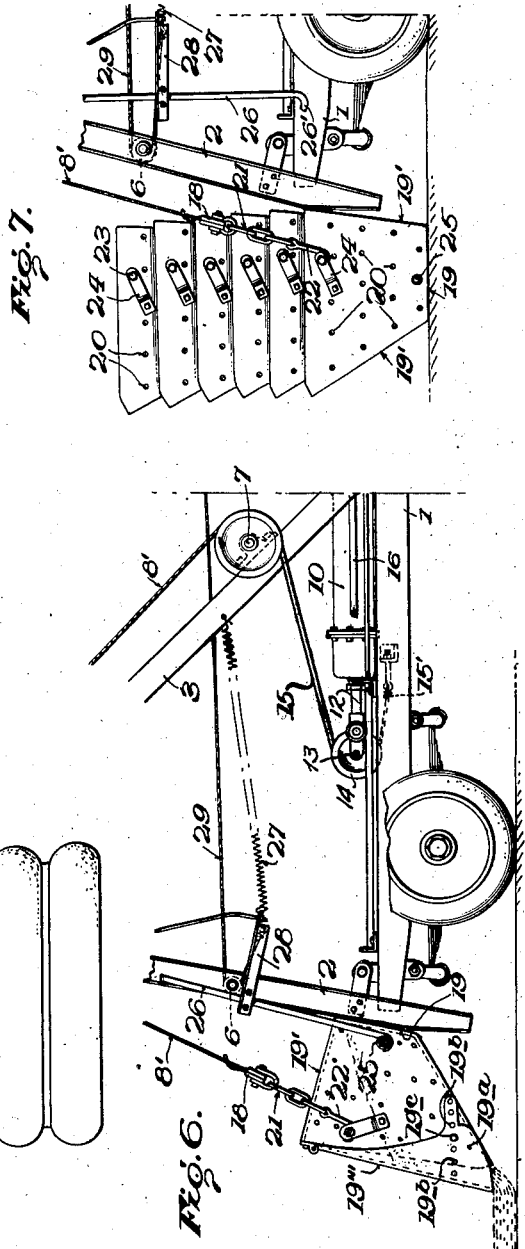
Inventor
George R. Dempster
By Cameron, Kerkam + Sutton
Attorneys Patented Feb. 2, 1937

2,069,697

UNITED STATES PATENT OFFICE 2,069,697

TRANSPORTING AND DUMPING VEHICLE

George R. Dempster, Knoxville, Tenn.

Application February 5, 1935, Serial No. 5,145

15 Claims. (Cl. 214—75)

This invention relates to means for transporting materials from one location to another and dumping the same when arriving at the desired destination.

It has heretofore been the custom to mount load receiving containers on a vehicle, such as an automotive truck, deposit the material to be transported therein, and when the vehicle reaches the desired destination, dump the material from the container. In these constructions containers form a permanent part of the construction, and the entire mechanism, including the automotive vehicle, stands idle while the container is being loaded. This container may be in the form of a dumping body on a vehicle or of a scoop or other bucket permanently attached to the vehicle. In constructions of this kind the expensive automotive truck or other vehicle, together with its driver, remain idle while the container is being loaded, with a resultant loss in time of the driver and in the operation of the expensive truck or vehicle.

An object of the present invention is to conserve the time of the driver of the vehicle and to keep the vehicle itself in almost constant operation, whereby at a reduced cost a largely increased amount of material may be transported by the vehicle in a given space of time.

With this object in view, an upwardly inclined, and preferably forwardly inclined track or way is mounted on a chassis or other part of the framework of a vehicle, preferably an automotive vehicle, such as a truck or tractor. Detachable buckets or other load receiving containers are provided to move upward and downward along said track or way, and a piston and cylinder are operatively and detachably connected to said bucket or container for elevating the same with its container along said track or way. Means, such as a rotary pump are provided for forcing liquid in said cylinder from one side of the piston to the other, said means being operated by a suitable motor, preferably the motor of the automotive vehicle when such is employed. By this means the bucket or container, with its load, is elevated into position to be transported from one locality to another. A valved by-pass from one end of the cylinder to the other, and around the piston therein, is provided, and when it is desired to deposit the container with its load in a given locality, the by-pass valve is opened and the container descends along said track or way by reason of its own weight, the speed of descent being controlled by the passage of the liquid in the cylinder from one side of the piston to the other thereof. This operation is accomplished without the pump and motor for operating the same. If instead of depositing the container with its load, it is desired to dump the container, means are provided for turning the container on its downward movement into a position to deliver the load, which means are preferably controlled by the driver of the vehicle from his seat.

By this means several containers may be in one locality, such as a stone quarry, where they are loaded by laborers, while the vehicle is transporting a loaded container to its destination and returning. Upon returning with the empty container the same is detached from the vehicle and left to be reloaded while another loaded container is attached to the vehicle in a few moments, and it, in turn, is transported to the desired locality.

The inventive idea is capable of receiving a variety of mechanical expressions, one of which for the purpose of illustrating the invention, is shown in the accompanying drawings, but it is to be expressly understood that such drawings are illustrative only and are not designed to define the limits of the invention, reference being had to the appended claims for this purpose.

Fig. 1 is a perspective view with parts in position for transporting the load;

Fig. 2 is a broken perspective detail of a modification;

Fig. 3 is a detail showing the means of connecting the cable to the container carrying bar;

Fig. 4 is a broken detail of one end of the container;

Fig. 5 is a plan view of the chassis and the forward cylinder (in section) with its operating connections;

Fig. 6 is a partial side elevation showing the parts in dumping position; and

Fig. 7 is a broken side elevation illustrating the manner of nesting the containers.

Referring to the drawings in which like reference numerals indicate like parts throughout the several views, 1 is a frame of a vehicle, here shown as the chassis of an automotive truck, 2—2 indicates two uprights, preferably in the form of angle bars, secured to the lower part of the rear end of the chassis 1, and preferably somewhat inclined toward the front part of the vehicle, while 3 indicates two brace bars, also preferably in the form of angle bars, which are secured at their lower ends to the opposite sides of the chassis. Preferably the lower ends of the uprights 2—2 are slightly beveled at their lower ends as shown at 2'—2', Fig. 1. A shaft 4 passes through the upper ends of the uprights 2—2 and the bars 3—3, the ends of the shaft 4 extending well out beyond the two uprights 2—2. Two sheaves 5—5 are mounted to turn on the shaft 4, one adjacent each of the uprights 2—2, and a third sheave 6 is mounted midway between the uprights 2—2, on a bar connecting said uprights. There is also mounted to turn in bearings on the lower part of the brace bars 3—3 a shaft 7, and keyed to the ends of the shaft 7, preferably just outside of the bars 3—3, are two drums 8—8, while midway between the brace bars 3—3 is a third drum 9, also keyed to the shaft 7. Mounted on the chassis 1 near the forward portion thereof, between the lower ends of the brace bars 3—3 and beneath the shaft 7, is a cylinder 10 having therein a piston 11 (see Fig. 5) and a charge of oil or other fluid. The piston rod 12 projects rearward from said cylinder and has thereon a forked bearing 13 for a shaft supporting a sheave 14. A cable 15 is secured at one end 15' to any suitable part of the vehicle forward of the sheave 14 and passes around said sheave and is wound around the drum 9 for a suitable number of turns, the end of said cable being fastened to the drum. A conduit 16 is connected to the rear end of the cylinder 10 and leads to a rotary pump 17 from which a conduit 16' leads to the forward end of the cylinder, the two conduits entering the cylinder at opposite sides of the piston 11 when the piston is in its forward position. Two cables 8'—8' are wound around the respective drums 8—8 and pass over the sheaves 5—5 and are connected to a cross bar 18 resting against the rear face of the track or way composed of the two uprights 2—2, said bar in its uppermost position being somewhat below the sheaves 5—5. 19 is a bucket or container, preferably made of wrought iron and having in its walls a large number of perforations 20. This container 19 has its front wall 19' (the one toward the front side of the vehicle) resting against the track or way composed of the uprights 2—2, and at its opposite end portions it is connected to the end portions of the bar 18 by any suitable means, here shown as chains 21—21, secured at one end to the bar 18 and having at the lower end a hook-like portion 22 to which, when the parts are in position to elevate the container, engage pins 23 projecting outward from the end walls 19'' of the container. Preferably these pins are in the form of bolts which pass through the end walls with a small section of piping on that portion of the bolt which is exterior to the container and secured by means of a nut bearing against the interior face of the end wall. Preferably also a suitable brace 24 is provided for each of these pins. Preferably the front and rear walls of the container flare outward and upward, the flare of the rear wall considerably exceeding that of the front wall; and preferably also the end walls flare slightly outward from the bottom of the container upward. Projecting from each end of the container, near the bottom thereof are two pins or bolts 25—25 which, like the pins 23, are in the form of bolts passing through the end walls of the container with a nut on the interior end thereof and a suitable section of pipe between the head of the bolt and exterior face of the end wall. The pins 25 are positioned slightly nearer the bottom portion of the front wall of the container than to the bottom portion of the rear wall of the container, so that a vertical plane passing through the center of gravity of the container and transversely to the vehicle will lie to the rear of the pins 25.

26—26 are two rods mounted to swing freely on the outwardly projecting ends of the shaft 4, the ends of these rods being provided with a shoulder or hook-like portion 26', and these rods are of such a length that when the container is in its uppermost position, as shown in Fig. 1, and the rods are swung rearward, the hook like portion 26' will be under the pins 25 on the ends of the container. Normally the rods 26—26 occupy the position shown in Fig. 1, that is withdrawn from the pins 25, dependence being placed either upon gravity or upon a spring 27 to hold them in their withdrawn position. The rods 26—26 are connected together by a bar 28 extending across the vehicle and having its opposite ends turned rearward, as shown in Fig. 1, and the rearward projecting ends or arms are connected to the rods 26. The medial portion of the bar 28 is forward of the sheave 6, and a line or cable 29 is connected to said portion of the bar 28 and passes over the sheave 6 and forward to a point in proximity with the driver's seat, and is connected to a suitable lever 30 by means of which the driver can exert a pull on the line 29 to swing the bar 28 and with it the rods 26—26 rearward to the position shown in Fig. 6, and if this is done at the time when the container is in its uppermost position as shown in Fig. 1, the hook-like portion 26' on each rod 26 will engage under the pins 25—25 as the container is lowered.

When the vehicle is backed up in proximity to a loaded container and the chains 21 are secured to the pins 22, the driver throws the pump 17 into operative connection with the motor through the clutch 31, and the liquid, preferably oil, is forced by the pump from the rear end of the cylinder to the opposite side of the piston, that is, to the front end of the cylinder, thus forcing the piston rearward, which, operating through the cable 15, revolves the drum 9, and with it the shaft 7 and the two drums 8, which two latter drums wind up the cables 8'—8' and thus serve to raise the container 19 along the track or way composed of the two uprights 2—2.

A by-pass conduit 32 is provided leading from the front end of the cylinder to the rear end thereof, and in this by-pass conduit is interposed a spring press valve 33, the spring of which normally tends to hold the valve closed, and a rod extends from this valve to a point adjacent the seat of the driver of the vehicle to the end that he may operate the same to open the valve.

When the container is in elevated position, shown in Fig. 1, the operator first shifts the lever 30 to throw the hooks 26' of the rods 26 under the pins 25, throws out the clutch 31 connecting the motor of the vehicle to the pump and then throws open the valve 33 and holds it open. This permits the oil in the cylinder 10 to pass from the forward side of the piston to the rearward side thereof under influence of the weight of the load in the container and the container starts to descend, whereupon the hooks 26' on the rods 26 engage the pins 25, and as the container continues to descend under its own gravity, it is tipped or turned from an upright position rearward, and when the rearward edge of the container reaches or approaches the ground, the bottom of the container rests against the track or way, and the material in the container will be dumped.

It will be noticed that the intake end of the conduit 16 leading from the cylinder to the pump is somewhat to the rear of the piston when the container is in its raised position, as shown in Fig. 5. Under such conditions the continued operation of the pump will circulate the oil through the cylinder, the conduit 16 and the pump without any tendency to further raise the container. The result of this is that when the container reaches its desired elevated position, it automatically stops in that position, and there is no danger of injury to the parts by the failure of the operator to disconnect the motor from the pump, and an unskilled laborer can readily operate the mechanism without danger of injury thereto.

It will also be noted that dependence is placed, not upon the motor of the vehicle, with the accompanying consumption of fuel, for controlling the lowering and dumping of the container, but that this is accomplished by the weight of the container itself, and yet under perfect control, since the container cannot descend any more rapidly than is made possible by the passage of the oil from the front to the rear side of the piston, through the valve-controlled by-pass.

By reason of the slightly outwardly flaring end and side walls of the containers and the ease with which the pins 25 may be removed therefrom, it is possible to nest a plurality of the containers one within the other as shown in Fig. 7. This is of importance when transporting a plurality of containers from one job to another. While on the job, for example, at a stone quarry, a plurality of containers may be placed on the ground and the stone or other material, which has to be lifted by hand, has to be raised but a very short distance by the workmen. When the container is filled, it is picked up in the manner heretofore described, by the vehicle, and carried to its destination, and dumped and returned to the quarry empty, and another loaded container immediately picked up and carried to its destination, and so on. It will thus be seen that there is no waste of the driver's time, and that an expensive truck or other vehicle is kept in constant operation. This effects a marked saving over that class of vehicles which have to stand still while the same is being loaded and then moved to the place where it is dumped, frequently as much time being consumed while the vehicle is idle and in loading operation as is employed in transportation to its destination.

It will also be noted that the structure is largely foolproof, since the loaded container cannot be raised to an undue or injurious position, and in lowering the same, the rate at which it moves downward is under absolute control. Further it will be seen that when it is desired to wash the container by flushing it with water, the dirty water readily escapes through the perforations 20.

It will be readily appreciated that, if desired, the drums 8—8 and 9 may be keyed to the shaft 4 (see Fig. 2) and the sheaves 5—5 mounted to turn on the shaft 7, and in this case the shaft 4 will be revolvably mounted in the upper ends of the uprights 2—2, while the shaft 7 is fixed in its bearings. The two constructions, however, are mere mechanical equivalents.

A convenient and preferable means of constructing the bar 18 is shown in Fig. 3 in which a wedge-shaped part 18' enters a correspondingly shaped slot 18" in the bar 18, and when the cable 8' passes around the wedge and the wedge inserted in position, the greater the stress exerted on the cable 8', the more effectively will the wedge 18' operate to pinch the cable in the slot 18".

It is often desirable to spread the material being dumped from the container to a uniform depth along the ground, and for the purpose of accomplishing this result, the container 19 may be provided with a cover 19''' hinged to the container at the forward side thereof, that is the side adjacent the front of the vehicle when the container is held in its elevated position on the track or way. This cover is preferably provided with end flaps or retainers 19ª, (Fig. 6) one at each end of the cover, for the purpose of preventing the material being dumped from spreading sidewise. The cover is provided with means for adjusting the extent to which it may be opened during the dumping, and thereby controlling the amount of material that will pass therefrom during a given time. This consists of a series of perforations 19ᵇ in the end flaps of the cover, through which any suitable retaining pin 19ᶜ projects into a corresponding hole or perforation in the end wall of the container.

By adjusting the cover 19''' so as to provide the desired opening, and then lowering the container to the position shown in Fig. 6, and driving the vehicle forward, the material within the container may be readily distributed at a uniform depth, as illustrated.

It will be readily understood by those skilled in the art that various modifications of the construction herein described can be made without departing from the principle or spirit of the invention, and such modifications as fall within the appended claims are intended to be covered thereby.

Having thus described the invention, what is claimed is:

1. The combination of a vehicle frame, an engine thereon, an upwardly extending track or way mounted on the rear of said frame, a cylinder with a piston therein mounted on said frame and containing a liquid, a pump operatively connected to said engine and forcing the said liquid from one side of said piston to the other, a valved by-pass around the piston, a load-receiving container movable along said track or way, a bar slidable along said track or way, means operatively connecting said bar to said piston, and means detachably connecting said bar to said container.

2. The combination of a vehicle frame, an engine thereon, an upwardly extending track or way mounted on the rear of said frame, a cylinder with a piston therein mounted on said frame and containing a liquid, a pump operatively connected to said engine and forcing the said liquid from one side of said piston to the other, a valved by-pass around the piston, a load-receiving container movable along said track or way, a bar slidable along said track or way, a pair of cables connected to said bar and operated by said piston, and means detachably connecting said bar to said container.

3. The combination of a vehicle, an upwardly extending track or way mounted thereon, a container mounted to move along said track or way, a shaft turning in bearings on said vehicle, a drum fast on said shaft, a cable secured at one end to said drum, a sheave mounted near the top of said track or way and over which said cable passes, means detachably securing the other end of said cable to said container, a cylinder, a power driven piston and piston rod therein, a sheave on the outwardly projecting end of said rod, and a cable secured at one end to the vehicle and passing over said last mentioned sheave and around a second drum secured to the same shaft as said first mentioned drum.

4. The combination of a vehicle, an upwardly extending track or way mounted thereon, a container mounted to move along said track or way, a shaft turning in bearings on said vehicle, a plurality of drums fast one on each end of said shaft, a plurality of cables one secured to each drum and windable thereon, a pair of sheaves mounted near the top of said track or way one on each side thereof and over which said cables pass, means detachably securing the other end of each cable to opposite sides of the container, a cylinder, a power driven piston and piston rod therein, a sheave on the outwardly projecting end of said rod, and a cable secured at one end to the vehicle and passing over the sheave on said rod and around a drum secured to the same shaft as said first mentioned drums.

5. The combination of a vehicle, an upwardly extending track or way mounted thereon, a container mounted to move along said track or way, a shaft turning in bearings on said vehicle, a drum fast on said shaft, a cable secured at one end to said drum, a sheave mounted near the top of said track or way and over which said cable passes, means detachably securing the other end of said cable to said container, a cylinder, a power driven piston and piston rod therein, a valved by-pass from one end of said cylinder to the other end, a sheave on the outwardly projecting end of said rod, and a cable secured at one end to the vehicle and passing over said last mentioned sheave and around a second drum secured to the same shaft as said first mentioned drum.

6. The combination of a vehicle, an upwardly extending track or way mounted thereon, a container mounted to move along said track or way, a shaft turning in bearings on said vehicle, a plurality of drums fast one on each end of said shaft, a plurality of cables one secured to each drum and windable thereon, a pair of sheaves mounted near the top of said track or way one on each side thereof and over which said cables pass, means detachably securing the other end of each cable to opposite sides of the container, a cylinder, a power driven piston and piston rod therein, a valved by-pass from one end of said cylinder to the other end, a sheave on the outwardly projecting end of said rod, and a cable secured at one end to the vehicle and passing over the sheave on said rod and around a drum secured to the same shaft as said first mentioned drums.

7. The combination of a vehicle, an upwardly extending track or way mounted thereon, a container mounted to move along said track or way, a shaft turning in bearings on said vehicle, a plurality of drums fast one on each end of said shaft, a plurality of cables one secured to each drum and windable thereon, a pair of sheaves mounted near the top of said track or way one on each side thereof and over which said cables pass, means detachably securing the other end of each cable to opposite sides of the container and near the top thereof, means controllable by the operator and for engaging and tipping said container when the same moves downward along said track or way, a cylinder, a power driven piston and piston rod therein, a sheave on the outwardly projecting end of said rod, and a cable secured at one end to the vehicle and passing over the sheave on said rod and around a drum secured on the same shaft as said first mentioned drums.

8. The combination of a vehicle, an upwardly extending track or way mounted thereon, a container mounted to move along said track or way, a shaft turning in bearings on said vehicle, a plurality of drums fast one on each end of said shaft, a plurality of cables one secured to each drum and windable thereon, a pair of sheaves mounted near the top of said track or way one on each side thereof and over which said cables pass, means detachably securing the other end of each cable to opposite sides of the container and near the top thereof, means controllable by the operator for engaging and tipping said container when the same moves downward along said track or way, a cylinder, a power driven piston and piston rod therein, a valved by-pass from one end of said cylinder to the other, a sheave on the outwardly projecting end of said rod, and a cable secured at one end to the vehicle and passing over the sheave on said rod and around a drum secured on the same shaft as said first mentioned drums.

9. The combination of a vehicle, an upwardly extending track or way mounted thereon, a container movable upward and downward on said track or way, pins projecting from said container on opposite sides and near the bottom thereof and to one side of a vertical plane passing through the center of gravity of the container transversely of the vehicle, and a pair of rearwardly swinging hooks for engaging said pins when the container is in its elevated position.

10. The combination of a vehicle, an upwardly extending track or way mounted thereon, a container movable upward and downward on said track or way, pins projecting from said container on opposite sides and near the bottom thereof and to one side of a vertical plane passing through the center of gravity of the container transversely of the vehicle, and means operable from the driver's seat to swing said hooks into their rearward position.

11. The combination of a vehicle, an upwardly extending track or way mounted thereon, a container movable up and down on said track or way, a cylinder, a piston therein, means operatively connecting said cylinder with a motor and transferring fluid therein from the front side of said piston to the rear thereof, and means operatively connecting said piston to the container, whereby said container is elevated, a valve controlled by-pass from the front side of said piston, to the rear side thereof, whereby the container is lowered by its own weight.

12. The combination of a vehicle, an upwardly extending track or way mounted thereon, a container movable up and down along said track or way, a liquid containing cylinder, a piston and piston rod therein, a conduit leading from a point in the cylinder just to the rear of the piston on its extreme outward stroke to a point in the cylinder to the rear of the piston when in its innermost position, means forcing the liquid from the outermost side of the piston to the innermost side thereof, a valved conduit leading from the cylinder at the outermost side of the piston to the cylinder at a point at the rear of the innermost position of the piston, and means operated on the outward stroke of the piston to raise said container along said track or way, whereby said piston acts as a power device to raise said container and a brake to control the downward movement thereof.

13. The combination of a vehicle, an upwardly extending track or way mounted on the rear thereof, a container movable thereon, a cylinder, a liquid and a piston and piston rod therein, power means forcing the liquid from the front side of the piston to the rear thereof and imparting an outward movement to the piston rod, means connected to the container and operated by the piston on its outward stroke to raise the container along said track or way, and a valved by-pass permitting the return of the liquid from the rear side of the piston to the front side thereof, whereby the container is lowered by its own weight.

14. The combination of a vehicle, an upwardly extending forwardly inclined track or way on the rear end thereof, a container movable along said track or way and tiltable for unloading, a cover hinged to the upper edge of the container when in unloading position, adjustable means limiting the opening movement of said cover, a cylinder, a piston therein, means operatively connecting said cylinder with a motor on said vehicle and transferring fluid therein from one side to the other of said piston, means operatively connecting the piston to said container, and a valve-controlled by-pass from one side to the other of said piston.

15. The combination of a vehicle frame, an engine, an upwardly extending track or way mounted on said frame, a container movable along said track or way, a cylinder with a piston therein and mounted on said frame and containing a liquid, means operatively connecting said piston and container, means operated by said engine and forcing the liquid in said cylinder from one side of said piston to the other, whereby said container is elevated, a by-pass connecting parts of said cylinder on opposite sides of said piston, and a valve controlling said by-pass, whereby said container is lowered by its own weight.

GEORGE R. DEMPSTER